May 12, 1931. F. W. ROLLER 1,804,953
MEASURING INSTRUMENT
Filed Jan. 13, 1926

Inventor
Frank W. Roller
By his Attorneys
Edwards, Sager & Bower

Patented May 12, 1931

1,804,953

UNITED STATES PATENT OFFICE

FRANK W. ROLLER, OF EAST ORANGE, NEW JERSEY, ASSIGNOR TO ROLLER-SMITH COMPANY, A CORPORATION OF NEW YORK

MEASURING INSTRUMENT

Application filed January 13, 1926. Serial No. 80,867.

This invention relates to measuring instruments such as ammeters and voltmeters, and the like, wherein a movable indicating element such as a needle is deflected varying amounts depending upon the quantity measured. More particularly it relates to instruments of this character which are provided with damping means, that is, means for preventing continued or prolonged oscillation of the indicating element. The principal objects of my invention are to provide an improved arrangement of damping device and its relation to the other elements of the instrument and an improved means for connecting the damping device to the movable indicating element.

In the preferred forms of my invention, an indicating needle is mounted on a rotary shaft, the damping device is separately mounted at one side of the shaft and the damping device is operatively connected to the needle. The actuating means for the shaft and the needle may then be located at one side of the shaft and in some cases between the shaft and damping device. By this arrangement, I can adapt the damping means to instruments of various forms of construction, such as those in which the actuating means of the instrument is located at one side of the shaft carrying indicating needle.

Other objects and advantages of my invention will appear from the following description taken in connection with the accompanying drawings, wherein Fig. 1 is a front view of the instrument showing one embodiment of my invention, the enclosing casing being removed.

Figure 1:
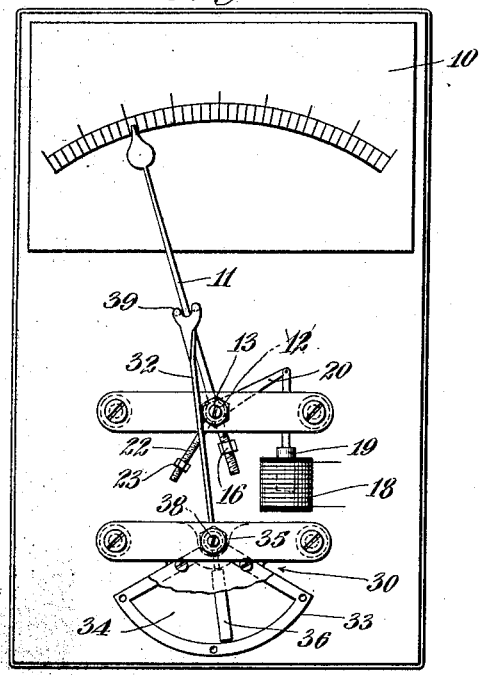
Figure 2:
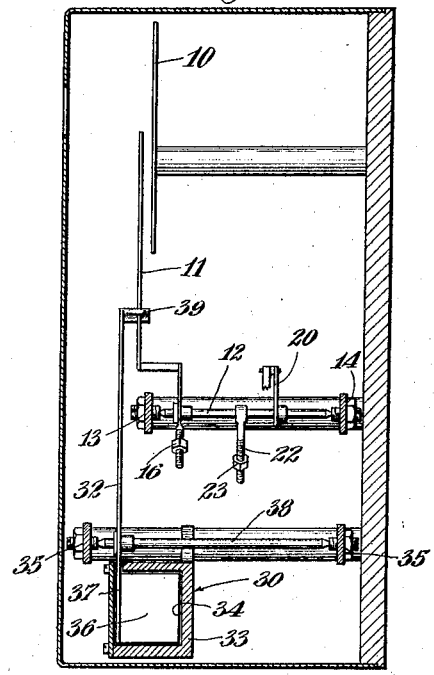
Fig. 2 is a side elevation, partly in section.

Referring to Figs. 1 and 2, 10 represents the instrument scale plate suitably mounted on the instrument frame, and 11 represents a needle secured to a shaft 12. The shaft 12 is rotatably supported at its ends in bearings 13 and 14, carried by the instrument frame, and the needle 11 below the shaft 12 is suitably counter-weighted at 16. 18 represents a solenoid having a suitably supported winding and a movable core 19 which is pivotally or flexibly connected with the outer end of an arm 20 fixed to the shaft 12. A second arm 22 fixed to the shaft 12 carries an adjustable weight 23. Arm 22 and weight 23 are employed to counter-balance the weight of the core 19 and the magnetic pull on the core. It will be seen from Fig. 1 of the drawing that as the shaft 12 and arm 22 are turned in a clock-wise direction, the moment of the weight 23 about the axis of the shaft 12 increases. Magnetic pulls on the core 19 of different amounts will, therefore, be balanced at different positions of the arm 22 and the needle 11 will come to rest in a different position for each different pull on the core 19, according to the amount of current to be measured passing in the winding of the coil 18.

For the purpose of causing the needle to assume its indicating position without continued oscillation, I provide a damping device 30 which comprises a receptacle 33 supported on the base of the instrument below the actuating means, and having a chamber 34, which, in lateral section, is sector-shaped, as shown in Fig. 1. Mounted to swing in the chamber 34 is a vane 36 which is carried by an arm 37 secured to a rotary shaft 38 supported in bearings 35 on the instrument frame. An arm 32 extends upwardly from the shaft 38 and at its upper end is formed an inwardly extending fork 39 which loosely embraces the needle 11 at a point some distance from its pivotal support. The arm 32 above the shaft 38, serves to counter-balance the weight of the vane and arm below the shaft so that these parts are in equilibrium for any position assumed by the vane.

It is evident that when the needle is actuated, the damping means will act effectively to avoid undue vibration or oscillation of the needle, the fork 39 sliding along a portion of the length of the needle and keeping in operative relation therewith during movement of the needle.

Figure 3:
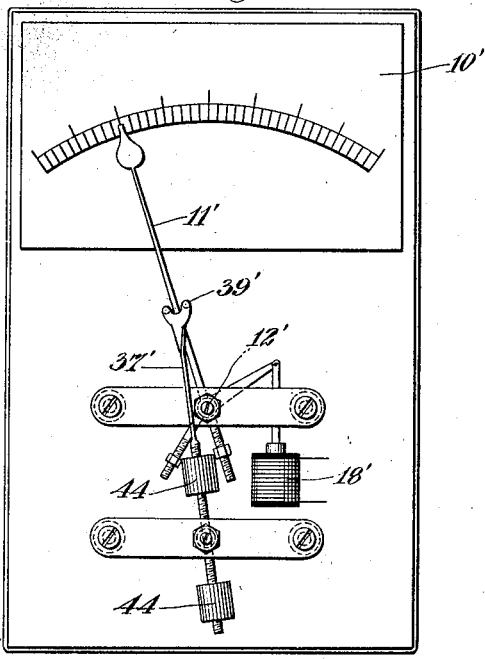
Fig. 3 is a view similar to Fig. 1, but showing a modified form of damping device and its connection with the needle.
Figure 4:
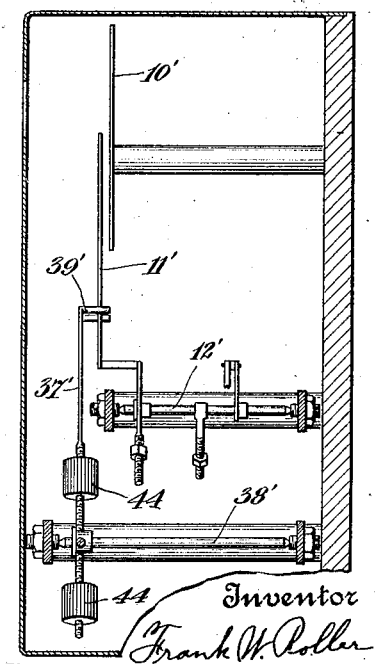
Fig. 4 is a side elevation of the structure shown in Fig. 3.

In the modified form shown in Figs. 3 and

4, I employ instead of a fluid damper, weights 44, 44 carried by an arm 37' mounted on the rotary shaft 38'. These weights are located on opposite sides of the shaft 38' and are, preferably, adjustable along the arm 37'. For this purpose the weights may be provided with screw threaded openings which engage screw threaded portions of the arm 37'. The upper end of the arm 37' is formed with an inwardly extending fork 39' which embraces the needle 11.

The prongs of the fork 39' are spaced apart to have some clearance between the prongs and the needle to permit the needle to have a certain limited range of movement in one direction or the other without engaging either prongs of the fork 39'. When the needle 11' is moved through a greater range it will engage one of the prongs and turn the arm 37' and weights 44. This will have a retarding action on the needle 11' because of the mass of the weights 44 and of the movable parts, and will dampen the movement of the needle in its first direction of movement. When the needle has overshot its position of equilibrium and starts to return thereto, it comes in engagement with the other prong which is then traveling in a direction opposite to it, all with the result that the excessive movement of the needle in both directions is damped.

It is apparent that the damping device is separately removable from the indicating means and from the base of the instrument without disturbing the indicating means, permitting convenient inspection and repair.

I claim:

1. A measuring instrument having a rotatable element, said element having an extension therefrom, a damping device having a rotatable damping element, the axis of said latter element being out of alignment with the axis of said first named element, and a sliding operable connection between said second named element and said extension.

2. In a measuring instrument, a rotary element, an indicating needle secured thereto, a damping device located at the side of the element opposite to said needle, and an arm connecting said device and needle.

3. In a measuring instrument, a supporting frame, a rotary element mounted thereon, an indicating needle secured to said element, a damping device removably mounted on said frame at the side of the element opposite to said needle, and an arm removably connecting said device and needle, said device and arm being removable from and replaceable on said frame without disturbing said needle and element.

4. In a measuring instrument, a rotary element, an indicating needle secured thereto, a damping device located at the side of said element opposite to said needle, an arm connecting said device and said needle, and actuating means for said element located between said element and damping device.

5. In a measuring instrument, a rotary element, an indicating needle rigid therewith and extending therefrom at one side thereof, a damping device located at the opposite side of said element, said damping device having a movable element movable about an axis parallel to the axis of said rotary element, and means for operatively connecting said rotary and movable elements comprising a member rigid with said movable element and loosely embracing said needle.

6. In a measuring instrument, a rotary element, a needle secured thereto and extending away from said element at one side thereof, a damping device comprising a receptacle located at the opposite side of said element and a vane in said receptacle pivotally mounted about an axis parallel to the axis of said element, and means for operatively connecting said needle and vane consisting of an arm rigid with said vane and formed with a forked end which embraces said needle.

FRANK W. ROLLER.